United States Patent
Duhamel et al.

(10) Patent No.: US 10,549,654 B2
(45) Date of Patent: Feb. 4, 2020

(54) VEHICLE SEAT WITH MOTORIZED PIVOTING MOVEMENT

(71) Applicant: Faurecia Sièges d'Automobile, Nanterre (FR)

(72) Inventors: Philippe Duhamel, Longjumeau (FR); Semir Hammadi, Brières-les-Scellés (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 1 day.

(21) Appl. No.: 16/044,132

(22) Filed: Jul. 24, 2018

(65) Prior Publication Data

US 2019/0135138 A1 May 9, 2019

(30) Foreign Application Priority Data

Jul. 24, 2017 (FR) ...................................... 17 57009
Nov. 7, 2017 (FR) ...................................... 17 60454

(51) Int. Cl.
*B60N 2/04* (2006.01)
*B60N 2/02* (2006.01)
(Continued)

(52) U.S. Cl.
CPC .............. *B60N 2/0232* (2013.01); *B60N 2/06* (2013.01); *B60N 2/14* (2013.01); *B60N 2/1615* (2013.01); *B60N 2002/0236* (2013.01)

(58) Field of Classification Search
CPC ........ B60N 2/14; B60N 2/0232; B60N 2/245; B60N 2/06; B60N 2/062
See application file for complete search history.

(56) References Cited

U.S. PATENT DOCUMENTS

| 4,846,529 A | * | 7/1989 | Tulley | ................ | B60N 2/0232 |
| | | | | | 297/344.23 |
| 5,524,952 A | * | 6/1996 | Czech | .................... | B60N 2/14 |
| | | | | | 296/65.12 |

(Continued)

FOREIGN PATENT DOCUMENTS

| DE | 2659330 A1 | 7/1978 |
| DE | 10120768 A1 | 10/2002 |

(Continued)

OTHER PUBLICATIONS

French Search Report for application No. FR 1757009, dated Mar. 21, 2018, 3 pages.

(Continued)

*Primary Examiner* — Shin H Kim
(74) *Attorney, Agent, or Firm* — Reising Ethington P.C.

(57) ABSTRACT

A vehicle seat having a pivoting function about a vertical axis (Z1). The seat includes a base configured for connection to the floor (PL) of the vehicle via longitudinal rails, a support frame mounted so as to rotate on the base by means of a pivot joint (JP) of axis Z1 and three curved slide connections (G1,G2,G3), a seating portion frame connected to the support frame directly or via a raising mechanism, and a motorization device interposed between the base and the support frame and configured to cause rotational movement of the support frame relative to the base. The axis Z1 of the pivot joint is eccentric with respect to a central area of the seating portion frame.

15 Claims, 8 Drawing Sheets

(51) Int. Cl.
*B60N 2/14* (2006.01)
*B60N 2/06* (2006.01)
*B60N 2/16* (2006.01)

(56) References Cited

U.S. PATENT DOCUMENTS

| | | | | |
|---|---|---|---|---|
| 6,547,303 | B1* | 4/2003 | Anderson | B60N 2/0232 296/68 |
| 7,204,554 | B2* | 4/2007 | Wieclawski | B60N 2/14 297/344.21 |
| 7,314,249 | B2* | 1/2008 | Becker | B60N 2/002 297/344.15 |
| 7,399,035 | B2* | 7/2008 | Kusanagi | B60N 2/245 296/65.07 |
| 7,452,019 | B1* | 11/2008 | Day | B60N 2/0232 296/65.16 |
| 7,871,116 | B2* | 1/2011 | Leitner | B60N 2/0232 296/65.01 |
| 8,182,016 | B2* | 5/2012 | Kaip | B60N 2/01583 296/65.06 |
| 8,800,976 | B2* | 8/2014 | Bethina | B60N 2/502 267/131 |
| 8,827,367 | B2* | 9/2014 | Hibi | B60N 2/0232 297/344.24 |
| 9,114,731 | B2* | 8/2015 | Horiguchi | B60N 2/06 |
| 9,242,581 | B2* | 1/2016 | Farooq | B60N 2/14 |
| 9,415,702 | B2* | 8/2016 | Auger | B60N 2/062 |
| 2015/0137572 | A1* | 5/2015 | Auger | B60N 2/062 297/344.21 |

FOREIGN PATENT DOCUMENTS

| | | |
|---|---|---|
| DE | 102009033494 A1 | 1/2011 |
| FR | 2883810 A1 | 10/2006 |
| GB | 384641 A | 12/1932 |
| GB | 2396102 A | 6/2004 |
| JP | S63162347 A | 7/1988 |
| JP | H0232441 U | 2/1990 |
| JP | H0287627 U | 7/1990 |
| JP | H09156404 A | 6/1997 |

OTHER PUBLICATIONS

French Search Report for application No. FR 1760454, dated Jun. 8, 2018, 2 pages.

* cited by examiner

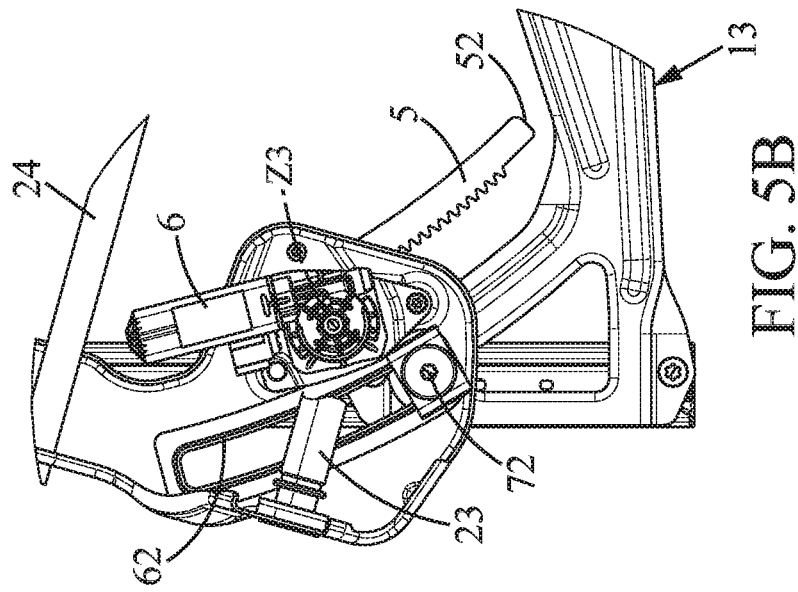
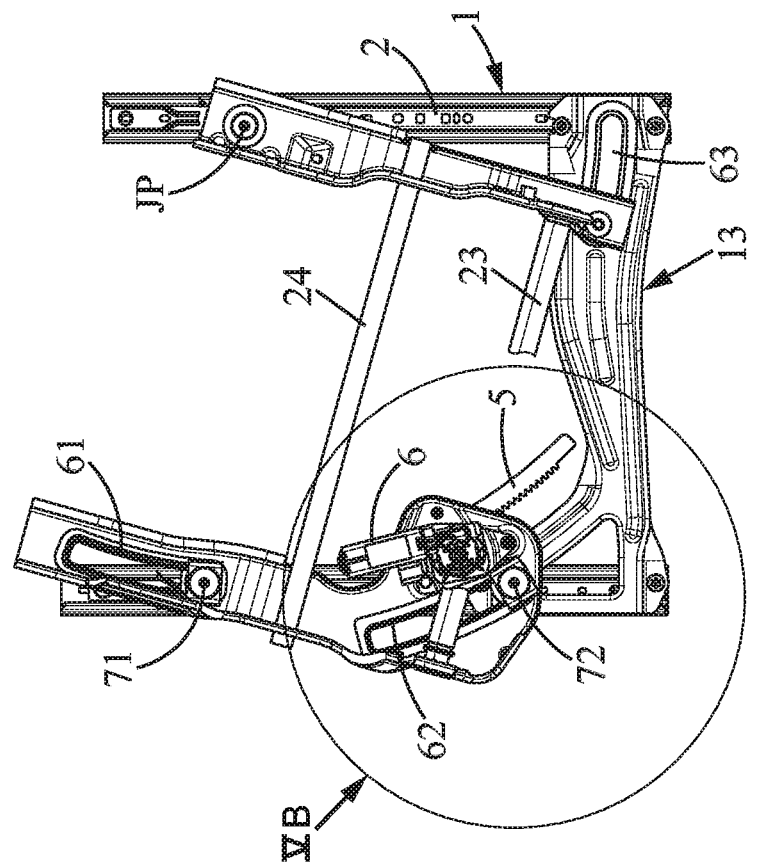

VEHICLE SEAT WITH MOTORIZED PIVOTING MOVEMENT

TECHNICAL FIELD

The present invention relates to vehicle seats with pivoting movement about a substantially vertical axis, in other words which have the feature of pivoting about an axis of rotation substantially perpendicular to the floor of the vehicle to which the seat in question is attached.

BACKGROUND

In vehicles which are automobiles, the ability to pivot a passenger seat to obtain a "living room" type of configuration has already been proposed, in other words at least one seat oriented in a position other than facing forward. It has also been proposed to use a vertical pivoting movement to facilitate the entry and exit of passenger(s) in a vehicle ("welcome function") when conventional wide access through the door is not available.

Some have proposed a movement about a central vertical axis equipped with motorization, for example as taught by document U.S. Pat. No. 4,846,529. However, it turns out that a substantially centered axis of rotation has certain disadvantages concerning the immediate environment of the seat such as the door or the center console, with which there may be interference. In addition, safety requirements have increased, and some known solutions are insufficient in terms of mechanical strength in case of impact or shock.

A need has therefore appeared for a vehicle seat having a pivoting function about a vertical axis which is better suited for avoiding mechanical interference with the environment and at the same time which satisfies impact resistance requirements.

SUMMARY

A vehicle seat is therefore proposed for this purpose, comprising a pivoting function about a vertical axis, the seat comprising:
- a base configured for connection to the floor (PL) of the vehicle via longitudinal rails,
- a support frame mounted so as to rotate on the base by means of a pivot joint of axis Z1 and at least three curved slide connections,
- a seating portion frame connected to the support frame, directly or via a raising mechanism,
- and a motorization device interposed between the base and the support frame and configured to cause rotational movement of the support frame relative to the base, and wherein the axis Z1 of the pivot joint is eccentric with respect to a central area of the seating portion frame.

With these arrangements, the connection between the base and the support frame is statically indeterminate (i.e. hyperstatic) and can withstand significant stress without deformation or detachment. In addition, the motorization provides a seat user with comfortable and effortless adjustment of the vertical orientation of the seat.

In addition, the central space under the seating portion remains clear and available, either for the feet of the passengers seated behind or for storing objects.

The term "curved slide connection" in this document is understood to mean a mechanical interface which guides along a predefined path and prevents translational movement with at least one degree of freedom (here the vertical direction) of one element relative to another. One will note that the path is not necessarily straight, in the current case being a predefined path substantially having the shape of a circular arc. Instead of "curved slide connection", one could also use the term "bilateral connection".

It should also be noted that the rotation of the support frame is completely decoupled from and independent of the longitudinal movement of the longitudinal rails connecting to the floor.

In various embodiments of the invention, one or more of the following arrangements may possibly also be employed, alone or in combination.

According to one option, the motorization device may comprise an electrical actuator, or a pneumatic actuator, or a hydraulic actuator. "Electrical jack" is understood to mean an electromechanical actuator generating linear motion. This represents a practical solution for implementing the motorization between the support frame and the base, using a hinged mounting at the respective ends of the body of the jack/cylinder and the movable/sliding maneuvering rod.

According to one option, the motorization device preferably comprises a rack and a gearmotor with an output pinion engaged with the rack, together forming a rack-and-pinion connection, the gearmotor being fixed to one among the base and the support frame, and the rack being fixed to the other among the base and the support frame. This forms a reliable, and robust solution in the field of seat mechanisms.

According to one option, the rack is preferably arcuate, preferably with a center of curvature substantially coincident with the position Z1 of the pivot joint axis. The mounting of the gearmotor can thus be very simple: direct attachment without rods or adapter.

According to one option, the gearmotor is preferably of the non-reversible type. It thus avoids having to use a specific system to brake or lock the current position.

According to one option, the gearmotor is preferably fixed to the support frame, and the rack is fixed to the base. The gearmotor may be more or less housed within the volume of the seating portion without encroaching on the storage space on the floor and/or the space available for the feet of the rear passenger.

According to one option, the pivot joint of axis Z1 is arranged at or near the left rear corner or right rear corner of the base of the seat, and the motorization device is arranged at or near the diagonally opposite corner.

Thus, a lever arm is used that is as large as possible in order to obtain rotation with a gearmotor of reduced size.

A 'welcome' function can be provided when the 'inside' rear corner (opposite the door) is used as the pivot point; it is also possible to provide a 'living room' function, meaning a rotation towards the interior of the vehicle when the outer rear corner (against the door) is used as the pivot point. It is also possible to propose a movement that combines both the inward orientation, in other words the 'living room' configuration, and the outward orientation, meaning the 'welcome' configuration.

According to one option, the pivot joint occupies a first corner of the base and the three curved slide connections respectively occupy the other three corners of the base.

This maximizes the stability of the assembly by a mechanical connection to each of the four corners of the base/support frame.

According to one option, the gearmotor is mounted astride the rack, preferably with a roller opposite the driving pinion, such that the rack is sandwiched between the output pinion of the gearmotor and the roller.

This is a very robust solution, which makes it possible to take into account variations in the industrial manufacturing of the rack and to eliminate problems with rack positioning variations; this also makes it possible to have a cantilever mounting of the rack.

According to one option, one or more curved slide connections are formed by an arcuate slot arranged in one among the base and the support frame, and a complementary mushroom-head pin received in said slot and fixed to the other among the base and the support frame. The arcuate slot has a banana (or bean) shape, and both ends form natural stops to restrict travel. The slots are obtained by stamping. This slot system forms a simple and proven solution for strong and effective guidance.

According to one option, each slot has a curvature such that its center of curvature is at or near the axis Z1 of the pivot joint.

A rotation is thus obtained that is substantially without friction or catching in the slide connections, and gaps that are potential noise generators can be avoided.

According to another option, one or more curved slide connections are formed by a jaw arranged in one among the base and the support frame, and an arcuate cheekpiece (which can also be called an arcuate rib or an arcuate blank) received in said jaw is fixed to the other among the base and the support frame.

This is an alternative solution in case the slot solution is not optimal.

According to one option, the rack is a flat and thick arcuate rod, preferably with cantilever mounting.

Such a rack rod can be obtained from a thicker blank than the sheet constituting the frame of the base or the support frame.

According to one option, the base comprises a front crosspiece, a left movable profile, and a right movable profile, and the rack is fixed on one of the movable profiles. Advantageously, the base is a rigid and coherent structure.

According to one option, the base preferably further comprises an auxiliary intermediate crosspiece comprising a longitudinal adjustment motorization assembly, the base preferably being without any rear crosspiece. This intermediate crosspiece allows synchronized control of the movement of the two movable profiles and also reinforces the coherence and rigidity of the base.

According to one option, the support frame comprises two side members and a central crosspiece connecting the two support frame side members. Advantageously, the support frame is a rigid and coherent structure.

According to one option, the support frame is deprived of any rear crosspiece. This preserves significant space available for the feet of the occupant sitting just behind the seat or for object storage space.

According to one option, the available angular travel of the support frame relative to the base is at least equal to 10 degrees and less than 50 degrees.

According to one option, the available angular travel covers an angular sector straddling a neutral position corresponding to the forward facing direction, meaning the direction of movement of the vehicle. One can thus combine the 'living room' configuration and the 'welcome' configuration as already mentioned above.

BRIEF DESCRIPTION OF DRAWINGS

Other features, objects, and advantages of the invention will be apparent from reading the following description of an embodiment of the invention, given by way of non-limiting example. The invention will also be better understood by referring to the accompanying drawings in which:

FIG. 5A is similar to FIG. 4A, with the support frame pivoted with respect to the base, FIG. 5B is an enlarged fragmentary view of the circled portion of FIG. 5A.

DETAILED DESCRIPTION

Figure 1:
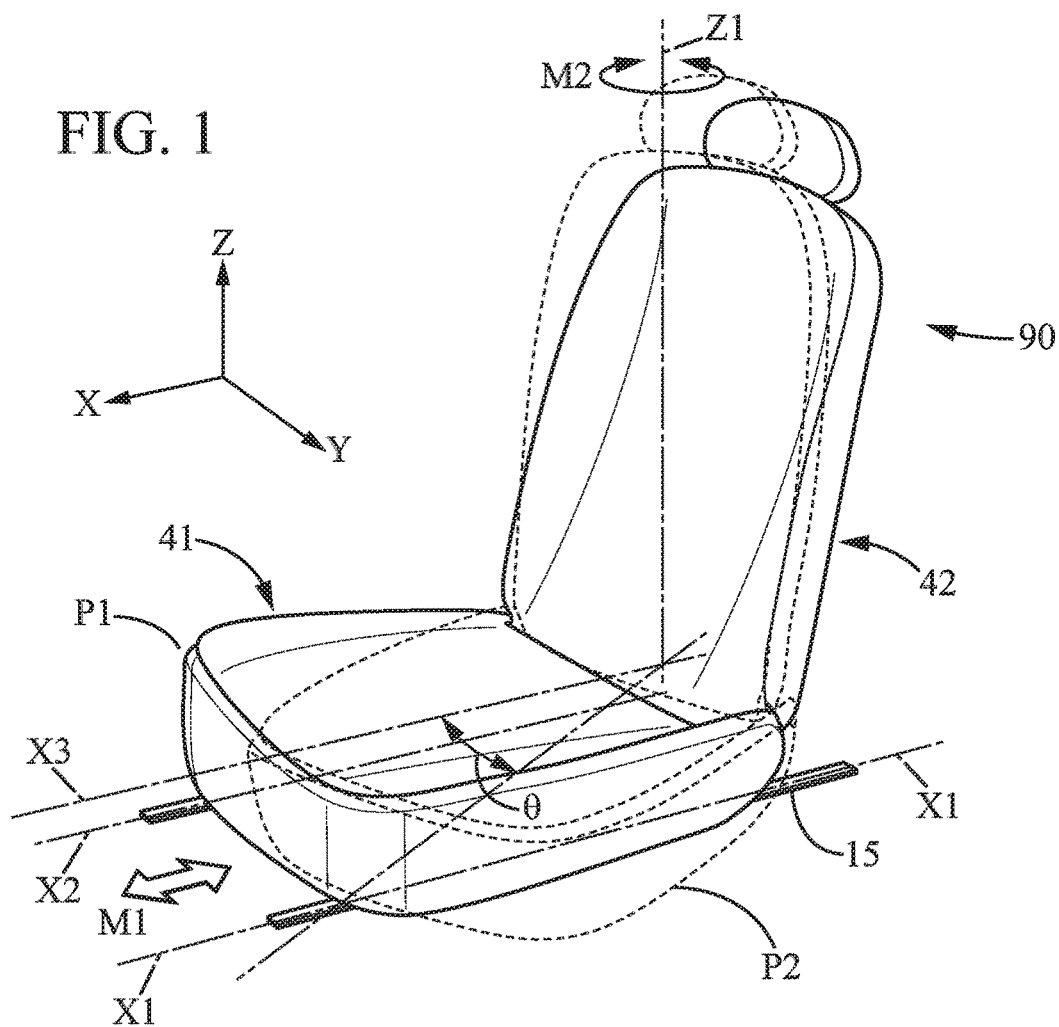
FIG. 1 is a general perspective view of a vehicle seat equipped according to the invention.
Figure 2:
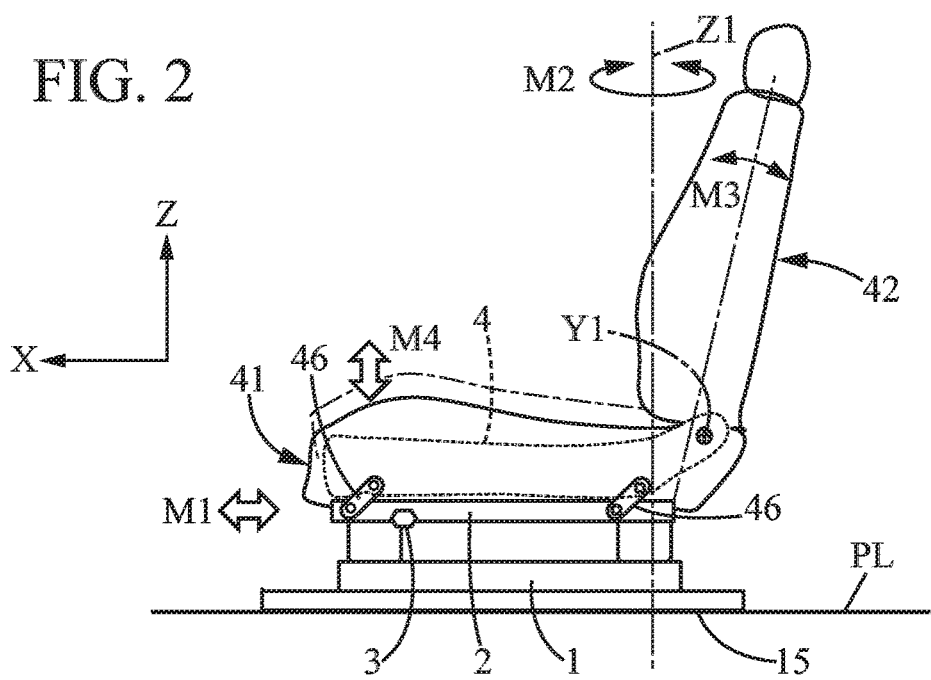
FIG. 2 is a general schematic profile view of the seat of FIG. 1.

In the various figures, the same references designate identical or similar elements.

In the text that follows, the term "forward facing" refers to a position of the seat where the seat is oriented towards the front of the vehicle, meaning that a person seated in the seat is facing exactly towards the front of the vehicle.

The seat pivoting function about a vertical axis can concern all occupants of a vehicle, namely the driver and the passengers sitting on seats which normally are all facing forward.

The pivoting function about the vertical axis may consist of a rotation of the seat towards the interior of the vehicle (living room function) to facilitate socialization in the vehicle or conversely of a rotation of the seat towards the exterior of the vehicle ("welcome" function) to facilitate access through an open door (entry and exit).

The illustrated example shows a simple rotation about an axis denoted Z1.

In the illustrated configuration, the available rotation angle range is less than 50 degrees. Such limited angular travel allows the mechanical configuration which will be described below.

In the following, the X direction corresponds to the longitudinal direction of the vehicle, the Y direction corresponds to the transverse direction of the vehicle, and the Z direction corresponds to the vertical direction of the vehicle.

General Structure

The seat 90 comprises a seating portion 41 and a backrest 42. The seat 90 is generally fixed relative to the floor of the vehicle PL. On the floor are provided longitudinal rails 15 which are known per se, possibly motorized. The left rail, of axis X1, comprises a fixed slide fixed to the floor and a movable profile 11 which can move in the longitudinal direction; similarly, the right rail, of axis X2, comprises a fixed slide fixed to the floor and a movable profile 12 which can move in the longitudinal direction.

The movable profiles 11, 12 are part of a structure which here is called the base 1. The movable profiles are connected by a front crosspiece 13. The front crosspiece 13 extends between the front ends of the movable profiles 11, 12, and is fixed to the front end portion of the left movable profile 11 and to the front end portion of the right movable profile 12.

The movable profiles 11,12 and the front crosspiece 13 are made of thick stamped sheet metal as is known in the field of metal seat frame structures.

In the illustrated case of a motorized longitudinal adjustment movement, a motorization assembly is provided which forms an intermediate auxiliary crosspiece 14 attached to the middle portion of the left movable profile 11 and to the middle portion of the right movable profile 12. Concerning the motorization assembly for longitudinal translational movement, the support, the electric motor 14M, the flexible drive cables, and the screw-nut connections are known and the reader can refer to document FR2883810 from the same applicant.

The base 1 forms a coherent and rigid frame which is guided in longitudinal translation relative to the floor of the vehicle. Guidance in the longitudinal rails reinforces the rigidity and solidity of the base (one will note that there is no rear crosspiece in the illustrated solution, which contributes to providing useful space for accommodating the feet of a passenger of objects (see below). The rigid base renders the left slider 11 and right slider 12 rigid with one another so that they move together in translation along the longitudinal direction, with no relative movement of one with respect to the other.

The longitudinal movement in translation is denoted M1.

Above the base, a support frame 2 mounted so as to rotate about a vertical axis Z1 is provided. The support frame 2 is a metal frame formed by a left side member 21, a right side member 22, and two crosspieces 23, 24 which connect the two side members. The crosspieces 23, 24 are tubular here but could have any other form. The support frame is a coherent and rigid structure that is slightly deformable under high stress.

The support frame 2 is connected to the base by a kinematic function and a motorization function, provided by a motorization device 3.

The motorization device 3 is functionally and mechanically interposed between the base 1 and the support frame 2; more precisely, it is supported by one of the two and acts on the other of the two.

The motorization device 3 for the pivoting function is described below with a rack and pinion solution as illustrated in the figures. However, the present invention also encompasses any possible means of motorization. In particular, one can choose a motorization device based on an electrical actuator, a pneumatic actuator, or a hydraulic actuator. "Electrical jack" is understood to mean an actuator generating linear motion (using for example a screw-nut mechanism), mounted as a telescoping extendable rod. For example, a hinged mounting may be provided at the respective ends of the actuator body and the activation rod, to allow the relative movements necessary for rotation of the support frame relative to the base.

The main body (i.e. cylinder) of the actuator is fixed to one among the base 1 and the support frame 2, and the movable rod of the actuator is fixed to the other among the base 1 and the support frame 2.

The seating portion 42 of the seat, seen from above, has the general shape of a square or rectangle. The frame 4 of the seat is supported on a square or even rectangular base corresponding to the seating portion but may be slightly smaller in dimension.

A "central area" ZC of the seating portion is defined as an area generally centered at the intersection of the diagonals and which extends possibly in proportion to the footprint of the seating portion on a surface area substantially equal to a quarter of the horizontal surface area defined by the seating portion frame. Note that the central area could be round, polygonal, etc.

The pivot axis of the seat Z1 is eccentric relative to the middle of the seat, meaning it is outside the central area ZC.

Typically, the central area ZC covers from 30% to 50% of the surface area defined by the two rails 15.

As will be seen for the second embodiment, the invention is not limited to pivoting in only one direction relative to the forward facing alignment.

Kinematics

The vertical pivoting motion is denoted M2.

For the kinematic function, a pivot joint JP of axis Z1 and guidance by three curved slide connections G1,G2,G3 are provided.

Referring to FIG. 1, when the seat is forward facing, in the position denoted P1, the pivot angle θ is zero (θ=0). When the seat pivots, the pivot angle increases (θ>0) to the position denoted P2. The seat (seating portion+backrest) pivots independently of the positions and longitudinal movements of the rails 15.

Note that the axis denoted X3 (reference for θ=0) is parallel to X and is convergent with Z1.

Each of the curved slide connections G1-G3 contributes to guiding the rotation about axis Z1 by disallowing movements in other degrees of freedom.

In the example shown, the curved slide connections are each formed by an arcuate slot 61,62,63 arranged in one among the base 1 and the support frame 2, and a complementary mushroom-head pin 71,72,73 received in said slot and fixed to the other among the base 1 and the support frame 2.

Each of the arcuate slots 61,62,63 forming curved slide connections extends substantially along an arc of circle centered on the pivot axis Z1 of the pivot joint JP, as visible from FIGS. 3,8,9,10. The first arcuate slot 61 extends substantially along an arc of circle centered on the pivot axis Z1 with a first radius R1. The second arcuate slot 62 extends substantially along an arc of circle centered on the pivot axis Z1 with a second radius R2. The third arcuate slot 63 extends substantially along an arc of circle centered on the pivot axis Z1 with a third radius R3.

The second arcuate slot 62 is arranged in the corner opposite to the pivot axis Z1, and the second radius R2 is greater than 30 cm, preferably greater than 35 cm. For the two other arcuate slots (i.e. first and third 61,63), the first and third radius R1,R3 are each greater than 20 cm, preferably greater than 25 cm.

Specifically, on the right side of the frame, the slots are formed in the support frame and the mushroom-head pins 71,72 are fixed in the right movable profile 12.

Conversely, at the front left corner of the frame, the slot is formed in the base and the mushroom-head pin 73 is fixed to the support frame 2.

In the illustrated example, the available angular travel is about 20 degrees. It is understood that the guiding slider system based on slots is very advantageous for mechanical maintenance but does not allow, within the usual dimensions of the seat frame, providing angular travel greater than 30 degrees, or 40 degrees, or even 50 degrees.

In general, depending on the configuration presented, the available angular travel will be between 12° and 50°.

In the example illustrated, the pivot joint JP of axis Z1 is arranged at or near the left rear corner of the base 1 of the seat, and the motorization device is arranged at or near the opposite corner diagonally (front right).

It should be noted here that the axis Z1 of the pivot joint could alternatively (not shown) be located at a position at a distance from the left rear corner and the right rear corner, with the presence of an offset support of fixed axis on the base and extending inward into the base area (cantilever mounting).

According to another configuration, of course, the pivot joint JP of axis Z1 can be arranged at or near the right rear corner of the base 1 and the motorization device is arranged at or near the diagonally opposite corner (front left).

Note that the pivot joint occupies a first corner of the base and the three curved slide connections respectively occupy the three other corners of the base. This makes it possible to distribute the stresses to which the seat may be exposed, as widely and in the most balanced manner as possible, particularly in the event of an impact to the vehicle.

"Bilateral" connection between the support frame and the base means that a force parallel to the axis of rotation and tending to move these two parts further apart or closer together produces substantially no relative movement of the support frame in relation to the base.

Thus, each of the bilateral connections between the support frame and the base prevents detachment due to the seating portion being torn off the base.

Since the seating portion is connected to the base by the three bilateral connections and by the pivot connection, which is a total of four connections, it is statically indeterminate (i.e. hyperstatic) between the support frame 2 and the base 1.

Motorization

For the motorization function as illustrated in the figures, there is provided a rack 5 and a gearmotor 6 with an output pinion 34 engaged with the rack 5 such that together they form a rack-and-pinion connection.

In the example shown, the gearmotor 6 is fixed to the support frame 2, and the rack 5 is fixed to the base 1.

However, in a reversed alternative configuration, the gearmotor 6 could be fixed to the base and the rack could be fixed to the support frame.

According to an advantageous aspect, the gearmotor 6 is of the non-reversible type. For example, it may comprise a worm gear transmission mechanism with a high reduction rate in which a torque exerted on the output member cannot rotate the motor. In other words, a torque exerted by the motor rotates the output member, but torque exerted on the output member even if very significant cannot rotate the motor in the opposite direction.

By this means, when the electric motor is not being controlled the gearmotor 6 acts as a strong brake, and therefore one can eliminate the need for a parallel locking mechanism to ensure that the current position is maintained with no intention of movement. This is useful not only when in a steady state but also if the vehicle is in motion (no rotation in case of vibration) and in case of impact (maintaining the current position in case of an accident).

Other Structural Elements

The vehicle seat usually comprises a feature of backrest tilt adjustment, meaning that the backrest 42 can rotate about a transverse axis denoted Y1, this rotational movement being denoted M3.

In addition to the longitudinal adjustment movement and the vertical pivoting, the seat may comprise a seat raising motion denoted M4, which in the illustrated case uses pivoting connecting rods denoted 46, which are known per se and therefore are not specifically described in detail here. For this raising motion, one end of each rod is fixed to the support frame 2.

Thus, the seating portion frame 4 is either connected directly to the support frame 2 in the absence of a raising mechanism, or is connected via said raising mechanism to the support frame 2.

The seating portion frame 4 is generally comprised inside the seating portion 41, which also comprises padding configured for receiving the user.

Rack and Pinion

The rack 5 is arcuate, preferably with a center of curvature substantially coincident with the position Z1 of the axis of the pivot joint JP.

The rack is created out of metal, preferably steel, by a stamping and cutting process, from a blank that is between 2 mm and 5 mm in thickness.

The rack comprises an attachment end 51 intended for mechanical connection to the base, a free opposite end 52, a long arcuate and smooth side 53, and an opposite long side having teeth 54.

In the illustrated example, the rack is fixed on the right moving profile 12, with a cantilever mounting at its attachment axis A, meaning that the end 52 opposite to the attachment is not attached to the base; it can slightly rotate about axis A.

According to one example, the rack is fixed by a screw 50 which allows a certain flexibility in rotation about a vertical axis A of the screw.

Thus, even if the curvature of the rack is not perfect with respect to the center of rotation of the support frame, the pinion 34 will always mesh perfectly due to the flexibility in the attachment of the rack.

In addition, the motorization device 3 is configured to sandwich the rack 5 between a retaining roller 35 and the driving pinion 34. The retaining roller may be mounted to rotate freely about axis Z6, so that the friction introduced by the motorization device is reduced.

Indeed, there are two similar flanges 31,32 one on each side of the rack, which contain bearing surfaces for receiving the axis Z6 of a follower roller 35 and the axis Z3 of the output pinion 34.

Sliding pads 70 interposed between each head of the mushroom-head pins and each of the complementary slots are provided.

Figure 3:
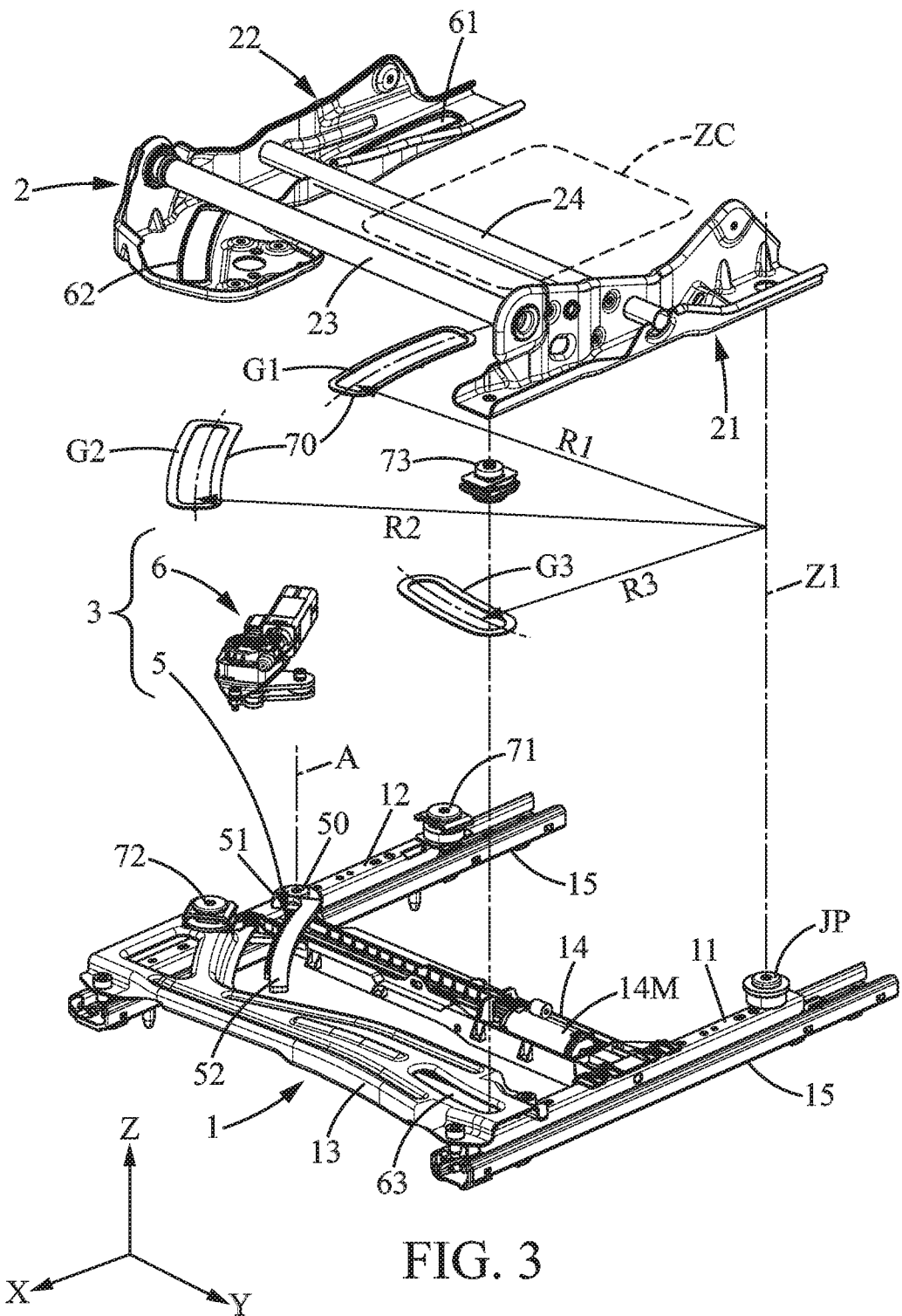
FIG. 3 is an exploded perspective view according to a first embodiment, illustrating elements contributing to the pivoting, with the base, the support frame, and the motorization.
Figure 4B:
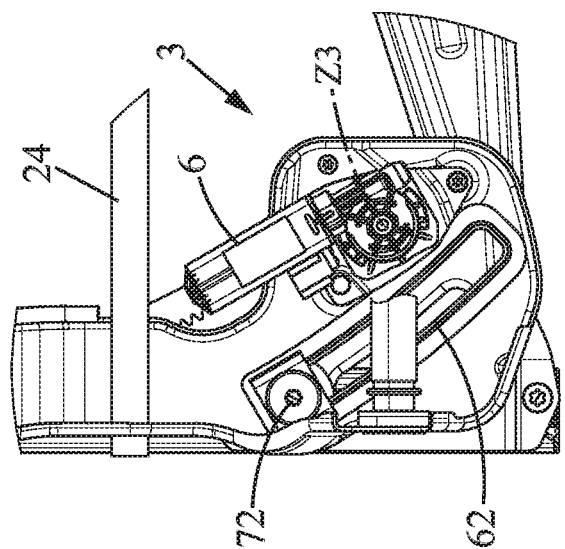
FIG. 4B is an enlarged fragmentary view of the circled portion of FIG. 4A.
Figure 4A:
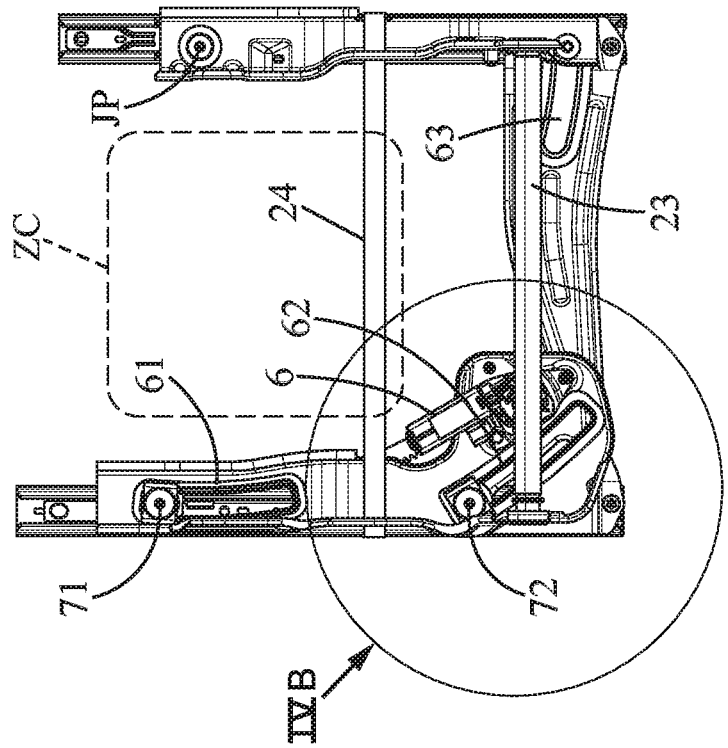
FIG. 4A is a top view according to the first embodiment, with a zero pivot angle.
Figure 6:
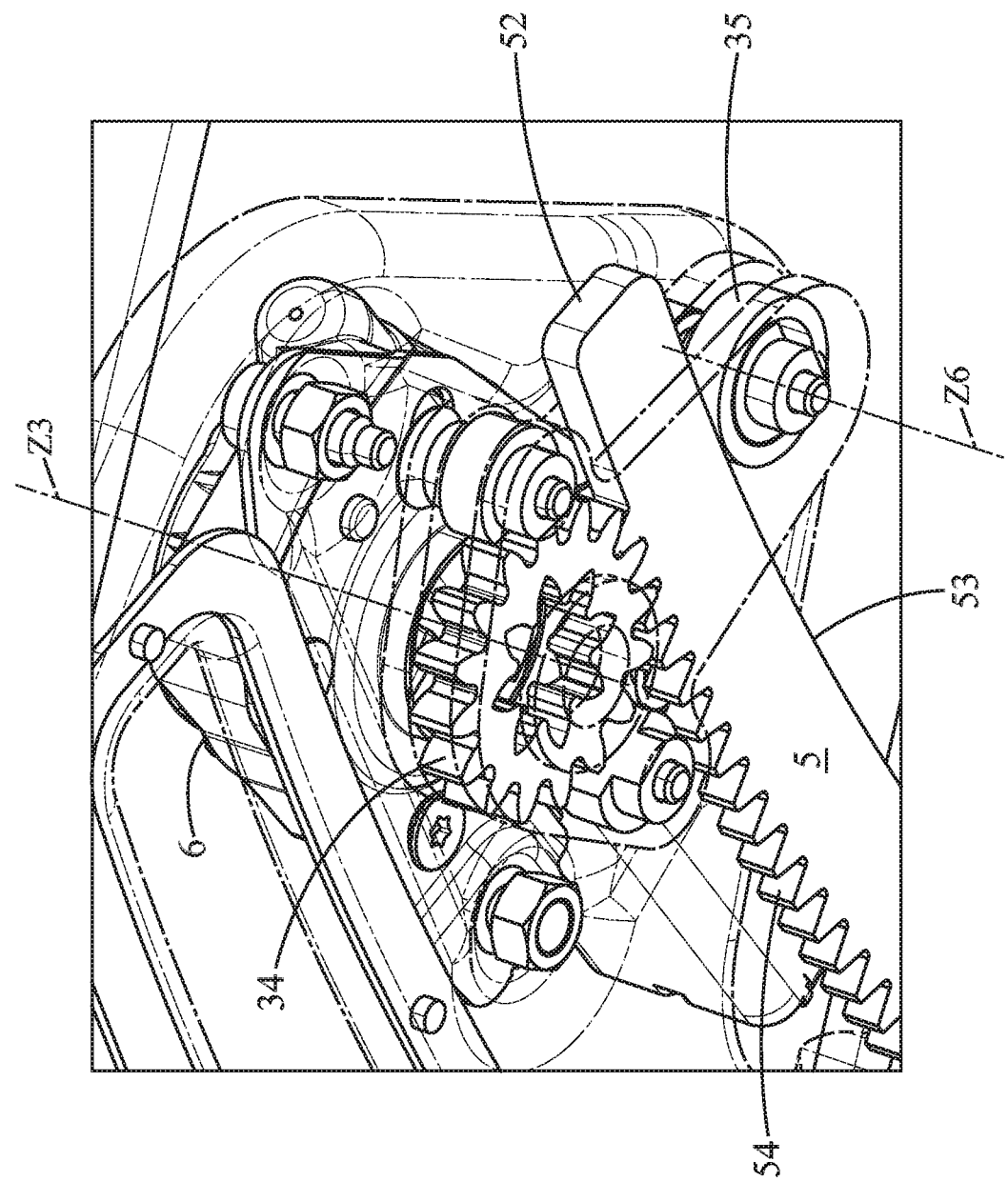
FIG. 6 is a detailed view of the motorization device.
Figure 7:
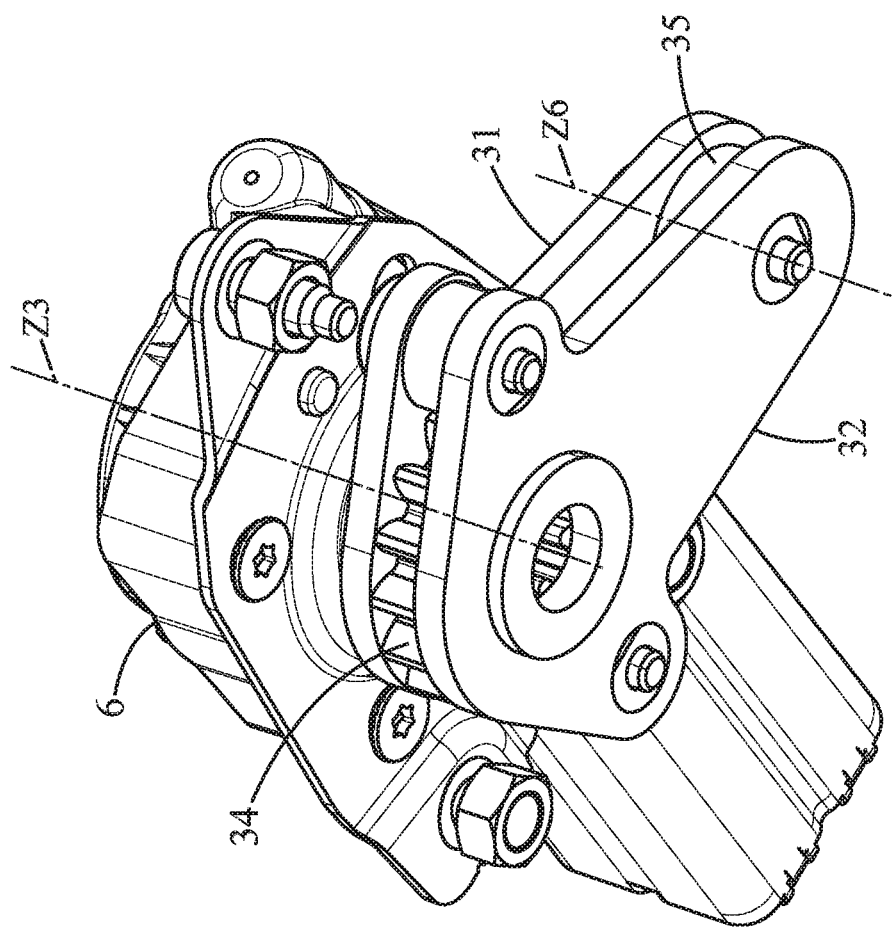
FIG. 7 is another detailed view of the motorization device.

In FIG. 3, the sliding pads 70 have been schematically and symbolically represented in the space between the base and the support frame to illustrate the function of the slide connections G1,G2,G3; in reality they are fixed either to the support frame or to the base in the direction of mounting the mushroom-head pin as will be seen below.

Figure 8:
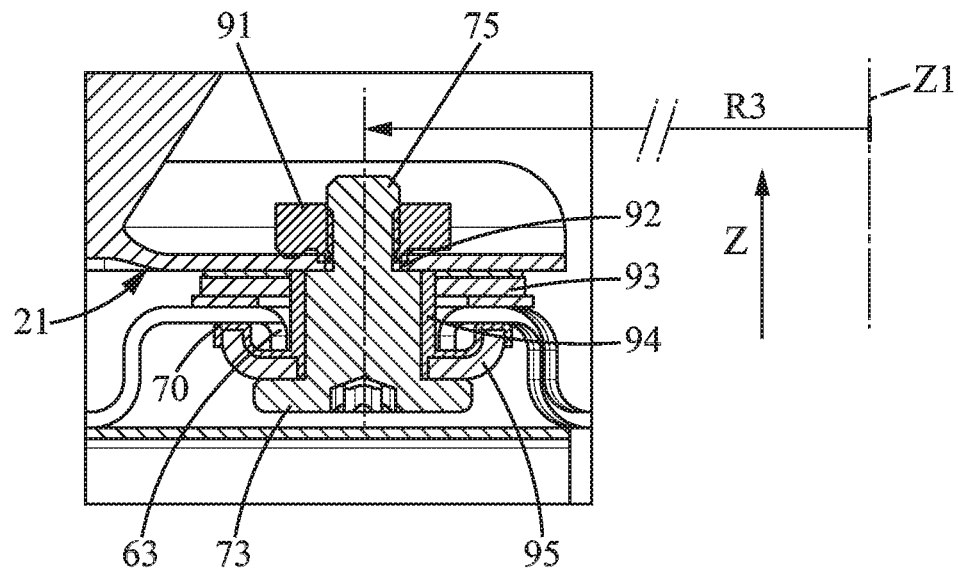
FIG. 8 is a detailed view in vertical section of one of the guiding devices, with the slot arranged in the base and the mushroom-head pin fixed to the support frame.
Figure 9:
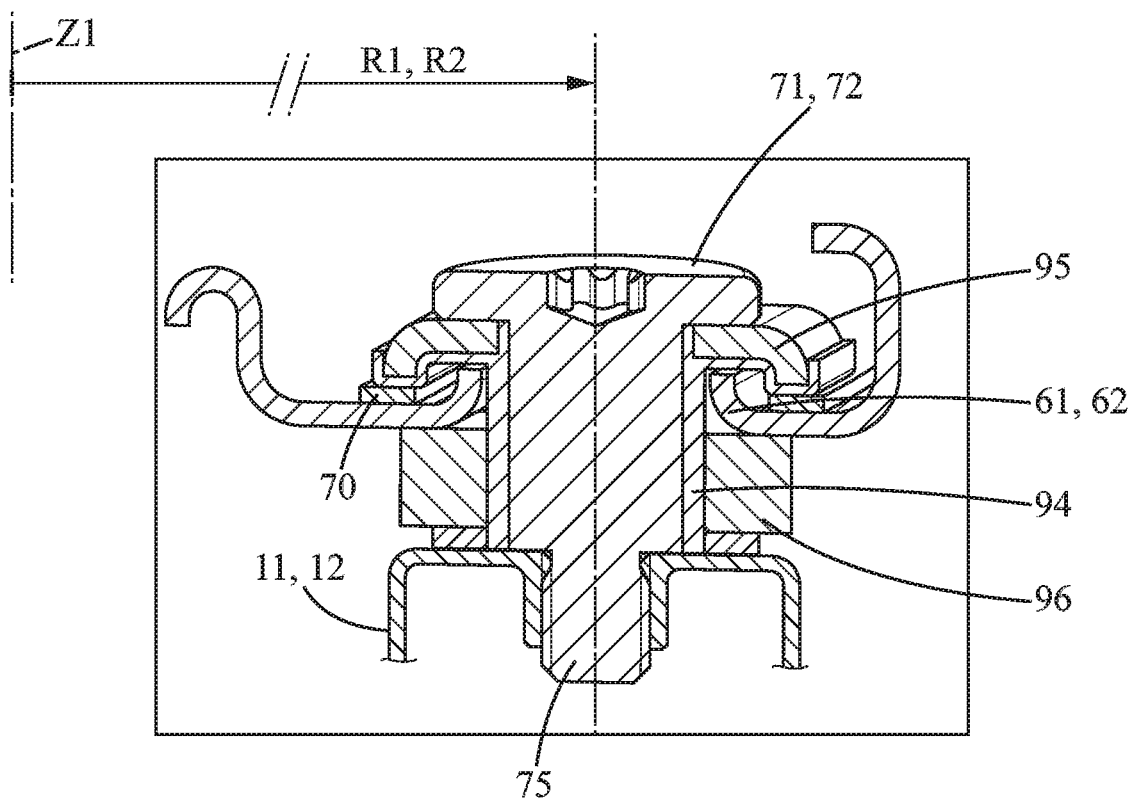
FIG. 9 is a detailed view in vertical section of one of the guiding devices, with the slot arranged in the support frame and the mushroom-head pin fixed to the base.

As shown in FIGS. 8 and 9, these illustrate two possible and opposite configurations concerning the arrangement of the slot 61,62,63 of the slide connection and of the complementary mushroom-head pin 71,72,73.

The mushroom-head pin 73 is fixed by a threaded connection 75 to the support frame 2, by means of a hole 92 and a lock nut 91. A spacer 93 is provided to maintain space between the base and the support frame. An interface bushing 94 for correctly positioning the parts before screwing may also be provided. The head of the mushroom-head pin 73 holds in place a clip 95 of generally square shape. The clip 95 comes to bear against a slide flange 70 fixed all around the slot 63. The axis of the mushroom-head pin 73 is located at a distance R3 from the axis of the pivot joint Z1.

Each of the mushroom-head pins (respectively 71,72) are fixed by a threaded connection to the movable profile 12 of the rail. There is a spacer 96 provided to maintain space between the top of the profile and the support frame.

An interface bushing 94 for correctly positioning the parts before screwing may also be provided. The head of the mushroom-head pin holds in place a clip 95 of generally square shape. This will come to bear against a slide flange 70 fixed all around the slot (respectively 61,62). The axis of the mushroom-head pin is located at a respective distance R1,R2 from the axis of the pivot joint.

Note that the edge of the slots, as they are formed by stamping, has a curved edge which minimizes the risk of the presence of burring interfering with the relative travel of the mushroom-head pin within the slot. Note that the interface bushing may be formed as a Teflon part to facilitate sliding without substantial friction.

Second Embodiment

Figure 10:
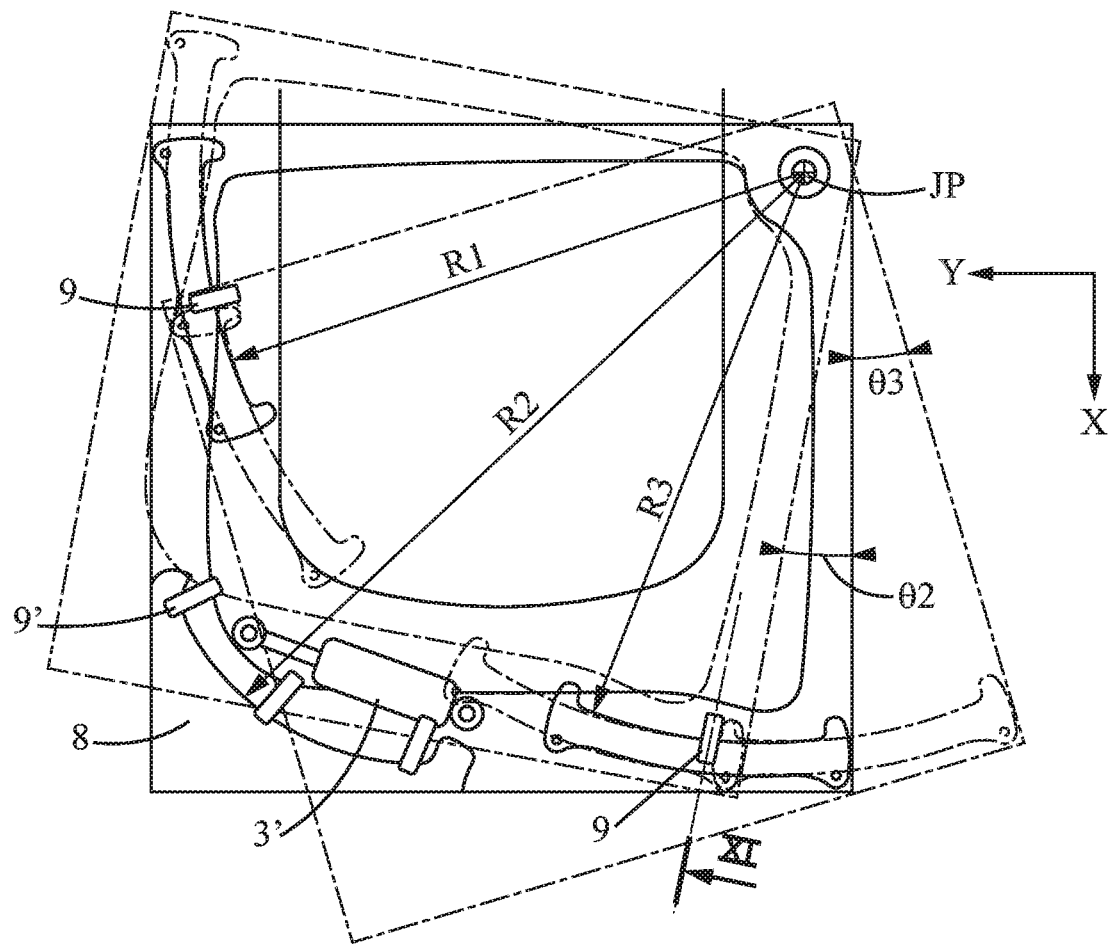
FIG. 10 is a top view of a second embodiment.
Figure 11:
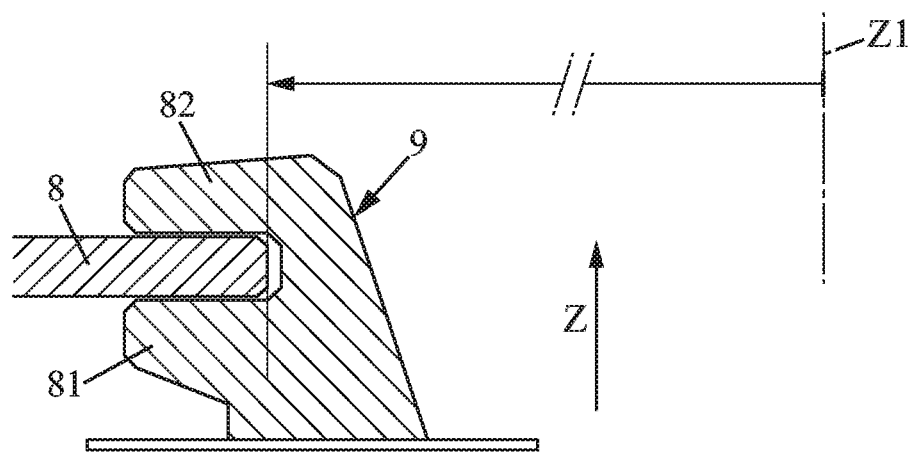
FIG. 11 is a detailed view in vertical section of a guiding device according to the second embodiment.

According to a second embodiment shown in FIGS. 10 and 11, a variant for the guidance function is represented. In place of slots and mushroom-head pins, jaws 9 are placed so as to face edges 8 forming a circular arc. Each of the jaws extends on either side of the circle edge and thus forms a stop preventing any movement along the vertical axis. In other words, the jaw forms a groove which receives the facing and relatively mobile part.

The jaw may be integral to the fixed base or integral to the rotating support frame.

More specifically, with reference to FIG. 10, for the guidance (slide connection) located diagonally to the pivot joint, the jaw 9' is carried on the support frame, and the circular arc edge is fixed to the base, while conversely for the other two slide connections, the jaw 9 is fixed to the base and it is the arcuate edge 8 which moves with the support frame.

As illustrated in FIG. 11, each of the jaws comprises a lower bearing surface 81, and an upper bearing surface 82 parallel to and spaced apart from the lower bearing surface by a distance slightly greater than the thickness of the arcuate edge 8.

One will note that the angular amplitude comprises a first area allowing displacement in the clockwise direction θ2 starting from a straight line in the forward facing direction, and a second area allowing displacement in the counter-clockwise direction θ3 starting from a straight line in the forward facing direction.

For example, there can be angular travel of + or −25°. The angular displacement is not necessarily symmetrical with respect to the position where θ=0.

FIG. 10 illustrates another solution for the motorization function. It concerns an actuator 3', typically an electrical actuator, although hydraulic actuators are not excluded. The body of the actuator is fixed for example to the base by means of a ball joint, and the actuating rod of the actuator is fixed for example to the support frame by means of a ball joint as well.

The invention claimed is:

1. A vehicle seat, comprising a pivoting function about a vertical axis, the seat comprising:
    a base configured for connection to the floor of the vehicle via longitudinal rails,
    a support frame mounted so as to rotate on the base by means of a pivot joint and at least three curved slide connections,
    a seating portion frame connected to the support frame, directly or via a raising mechanism, and
    a motorization device interposed between the base and the support frame and configured to cause rotational movement of the support frame relative to the base,
    wherein the axis of the pivot joint is eccentric with respect to a central area of the seating portion frame.

2. The vehicle seat according to claim 1, wherein the motorization device comprises an electrical actuator, or a pneumatic actuator, or a hydraulic actuator.

3. The vehicle seat according to claim 1, wherein the motorization device comprises a rack and a gearmotor with an output pinion engaged with the rack, together forming a rack-and-pinion connection, the gearmotor being fixed to one among the base and the support frame, and the rack being fixed to the other among the base and the support frame.

4. The vehicle seat according to claim 3, wherein the rack is arcuate, preferably with a center of curvature substantially coincident with the position of the pivot joint axis.

5. The vehicle seat according to claim 3, wherein the gearmotor is of the non-reversible type.

6. The vehicle seat according to claim 3, wherein the gearmotor is fixed to the support frame, and the rack is fixed to the base.

7. The vehicle seat according to claim 1, wherein the pivot joint is arranged at or near the left rear corner or right rear corner of the base of the seat, and the motorization device is arranged at or near the diagonally opposite corner.

8. The vehicle seat according to claim 7, wherein the pivot joint occupies a first corner of the base and the three curved slide connections respectively occupy the other three corners of the base.

9. The vehicle seat according to claim 3, wherein the gearmotor is mounted astride the rack.

10. The vehicle seat according to claim 3, wherein the gearmotor is mounted astride the rack, with a roller opposite the driving pinion, such that the rack is sandwiched between the output pinion of the gearmotor and the roller.

11. The vehicle seat according to claim 1, wherein one or more curved slide connections are formed by an arcuate slot arranged in one among the base and the support frame, and a complementary mushroom-head pin received in said slot and fixed to the other among the base and the support frame.

12. The vehicle seat according to claim 11, wherein each slot has a curvature such that its center of curvature is at or near the axis of the pivot joint.

13. The vehicle seat according to claim 1, wherein each of the three curved slide connections are formed respectively formed by three arcuate slots, wherein each of the arcuate slots extends substantially along an arc of circle centered on the pivot axis of the pivot joint, wherein the first arcuate slot extends substantially along an arc of circle with a first radius, wherein the second arcuate slot extends substantially along an arc of circle centered with a second radius, wherein the third arcuate slot extends substantially along an arc of circle with a third radius, wherein each of the first, second and third radius are greater than 20 cm.

14. The vehicle seat according to claim 1, wherein one or more curved slide connections are formed by a jaw arranged in one among the base and the support frame, and an arcuate cheekpiece received in said jaw is fixed to the other among the base and the support frame.

15. The vehicle seat according to claim 1, wherein the three curved slide connections are formed by first and second curved slots arranged in the support frame for receiving respective first and second corresponding mushroom-head pins attached to the base, and a third curved slot formed in the base with a third corresponding mushroom-head pin attached to the support frame.

* * * * *